Feb. 26, 1929.
F. A. WHITTEN
SPRING SUSPENSION
Filed Aug. 3, 1925
1,703,328
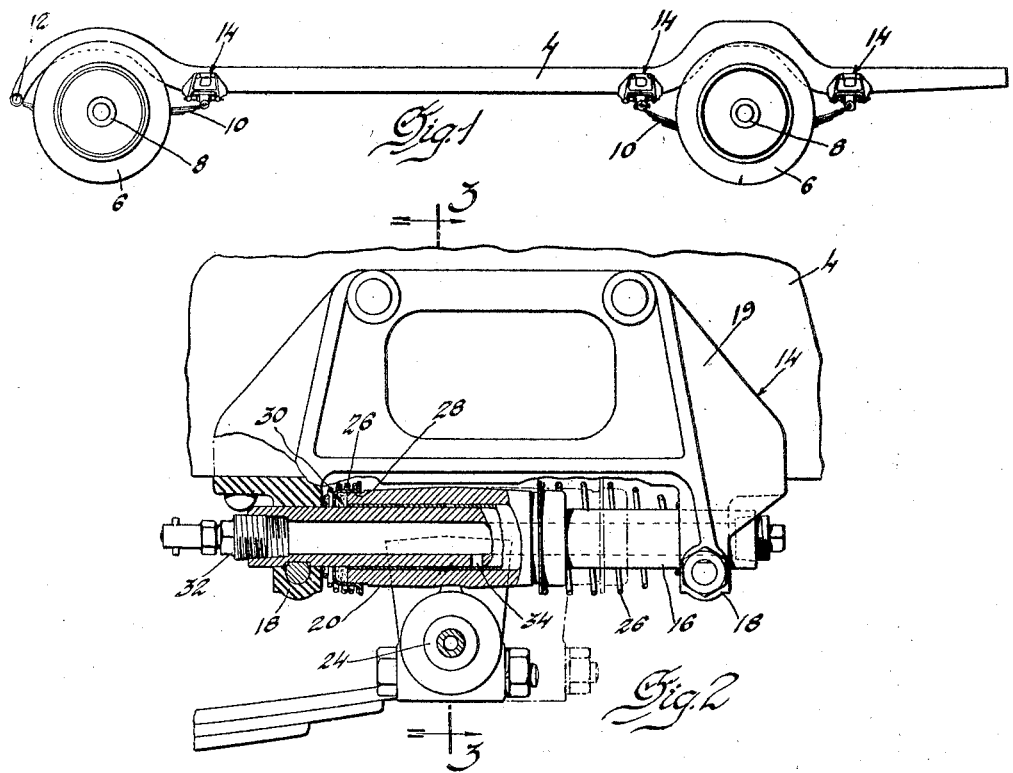
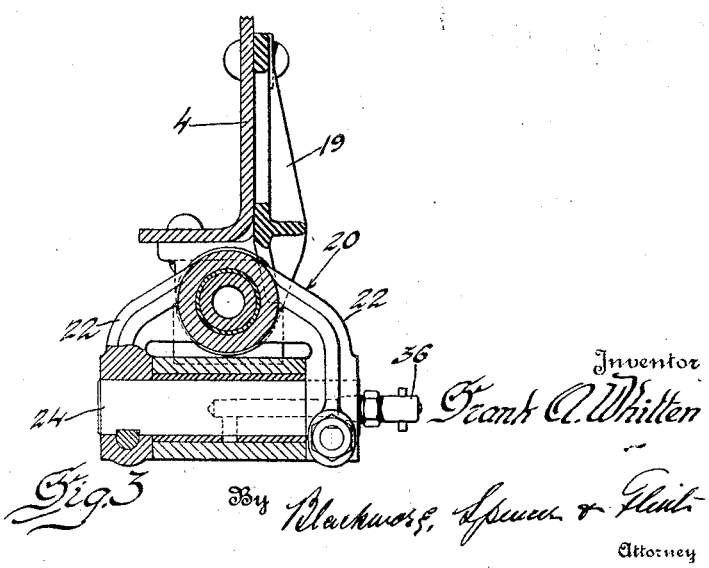
Inventor
Frank A. Whitten
By Blackmore, Spencer & Flint
Attorney Patented Feb. 26, 1929.

1,703,323

UNITED STATES PATENT OFFICE.

FRANK A. WHITTEN, OF DETROIT, MICHIGAN, ASSIGNOR TO GENERAL MOTORS CORPORATION, OF DETROIT, MICHIGAN, A CORPORATION OF DELAWARE.

SPRING SUSPENSION.

Application filed August 3, 1925. Serial No. 47,890.

The object of this invention is to provide a novel spring suspension which will effectively cushion the vehicle frame from jars and vibrations which might otherwise be transmitted to it from the road wheels. This spring suspension is characterized by the fact that I have secured the ends of the springs to the frame by novel connections which permit greatly varied movement of the ends of the springs with respect to the vehicle frame thereby absorbing many of the road shocks and relieving strains, particularly twisting strains, to which the leaf springs are subjected.

The specific end connection which I have found to be most satisfactory is one which permits substantially universal movement of the end of the spring with respect to the frame at the same time embodying a cushioning means for yieldingly resisting endwise movements of the ends of the springs thus eliminating one source of shock.

Referring to the drawings which show a preferred embodiment of my invention:

Figure 1 is a side elevation of a chassis to which my invention has been applied;

Figure 2 is a side elevation partly in section, showing my improved end connection; and Figure 3 is a section on line 3—3 of Figure 2.

In Figure 1, I have denoted by the reference character 4 a conventional frame supported by wheels 6 mounted upon the usual axles 8. Between the axles and the frame I have interposed springs which may be of the semi-elliptic type as shown at 10.

The forward end of the front spring I have shown connected to the frame by a conventional pivot shown at 12 while the rear end of the front spring and both ends of the rear spring I have shown connected to the frame by my novel end connection indicated, generally, by the reference character 14.

This end connection 14 consists essentially of a guide member 16 fixedly mounted in ears 18 integral with the bracket 19 bolted to the frame. Upon the guide member 16 is mounted for sliding and lateral rocking movement member 20, the shape of which is more clearly shown in Figure 3 and which comprises depending arms 22 in which is fixedly mounted a pivot bolt 24 upon which the end of the spring is rotatably secured. The sliding movement of the member 20 is cushioned by coil springs 26 which surround the member 16 bearing at one end against the ears 18 and at their other ends against flanges formed upon cup-shaped members 28 which serve to hold packing such as shown at 30 in position. This packing serves as a wiper to remove gritty particles which may collect upon the member 16 and also to prevent the escape of oil which is supplied to the sliding surfaces from the reservoir 32 formed in the member 16 through the duct 34. The pivot bolt 24 may be lubricated by any convenient means such as shown at 36.

In addition to permitting maximum flexibility in the connection of the ends of the spring to the frame and thus absorbing a great variety of shocks the present construction has the advantage that it permits easy assembly of the springs for the arms 22 may readily be adjusted so that the openings therein aline with the eye formed in the end of the spring permitting ready passage of the bolt 24. In prior constructions this assembly has frequently been difficult of accomplishment for the ears formed upon the ends of the springs cannot be manufactured with sufficient accuracy so that they will always aline with the openings in the shackle for the passage of the shackle bolt. Consequently it was necessary to twist the spring to get the bolt in position and this twisting greatly increased the wear on the parts.

I claim:

1. The combination of a vehicle frame, a load bearing axle, a leaf spring interposed between axle and frame, and a connection between the end of the spring and the frame, including a hollow shaft extending longitudinally of the frame and having a lateral opening, a coupling sleeve slidably engaged on said shaft and overlying the opening in all positions of adjustment, said hollow shaft permitting lubricant to be supplied the bearing surfaces of the sleeve and shaft, a packing collar surrounding the shaft, a retainer cup for said packing collar at the end of said sleeve, and a yielding tension element maintaining the cup and packing against the end of the sleeve thruout its range of sliding movement.

2. The combination of a vehicle frame, a load bearing axle, a leaf spring fastened to the axle and having a sliding connection between its end and the frame, said connection including a hollow guide shaft carried by the frame, and extending longitudinally thereof, a sleeve at the end of the spring slidably engaging said guide shaft, said hollow shaft constituting a lubricant reservoir and having a discharge port leading to the engaging surfaces of the shaft and sliding sleeve, packing seals at the respective ends of said sleeve and surrounding said shaft, retainer cups for the packing seals, fitting over the ends of said sleeves but independent thereof, and variable tension means exerting force on the cups to maintain their relation with the sleeve ends.

3. The combination of a vehicle frame, a load bearing axle, a leaf spring fastened to the axle and having sliding connections between its ends and the frame, such connections each including a bracket fixedly carried by the frame, having a pair of dependent ears spaced longitudinally of the frame, a shaft carried by said ears, a sleeve slidably engaged on said shaft and transversely pivoted to an end of the leaf spring, said shaft being formed to provide a lubricant reservoir, means for supplying lubricant to the engaging surfaces, a pair of cup-shaped members telescopically engaging the sleeve at the respective ends, thereof, packing material carried within said cup-shaped members, and coil springs interposed between the respective bracket ears and said cup-shaped members, whereby the cup-shaped members are maintained in engagement with said sleeve.

In testimony whereof I affix my signature.

FRANK A. WHITTEN.